United States Patent
Sherry et al.

(10) Patent No.: US 9,177,008 B1
(45) Date of Patent: Nov. 3, 2015

(54) POSITIONED UPDATES IN A DISTRIBUTED SHARED-NOTHING DATA STORE

(71) Applicant: Pivotal Software, Inc., Palo Alto, CA (US)

(72) Inventors: Gavin Sherry, San Mateo, CA (US); Ashwin Kumar, San Carlos, CA (US)

(73) Assignee: Pivotal Software, Inc., Palo Alto, CA (US)

( * ) Notice: Subject to any disclaimer, the term of this patent is extended or adjusted under 35 U.S.C. 154(b) by 0 days.

(21) Appl. No.: 14/566,603

(22) Filed: Dec. 10, 2014

Related U.S. Application Data

(62) Division of application No. 13/537,978, filed on Jun. 29, 2012, now abandoned.

(51) Int. Cl.
*G06F 17/30* (2006.01)

(52) U.S. Cl.
CPC .............................. *G06F 17/30345* (2013.01)

(58) Field of Classification Search
CPC ................... G06F 17/30554; G06F 17/30696; G06F 21/6218; G06F 21/6227; G06F 17/245; G06F 17/30501
See application file for complete search history.

(56) References Cited

U.S. PATENT DOCUMENTS

| | | | | |
|---|---|---|---|---|
| 5,835,904 A | * | 11/1998 | Vicik et al. | 707/999.008 |
| 6,085,189 A | * | 7/2000 | Pirahesh et al. | 707/999.002 |
| 7,231,385 B2 | * | 6/2007 | Bernal et al. | 707/999.003 |
| 7,831,593 B2 | * | 11/2010 | Burger et al. | 707/718 |
| 2004/0139078 A1 | * | 7/2004 | Nakano et al. | 707/10 |

* cited by examiner

*Primary Examiner* — Yuk Ting Choi
(74) *Attorney, Agent, or Firm* — Fish & Richardson P.C.

(57) ABSTRACT

Updatable cursors for positioned updates are provided in a distributed shared-nothing data store by associating with each row of data in a result set hidden metadata that identifies the segments and the locations on such segments of such row. When an update is issued to data under a cursor, the associated metadata is transparently inserted into the update statement before it is dispatched to the segments to insure that the correct data is accurately updated. For cached query statements, generic metadata identifiers are used for building and caching, and the actual metadata identifiers are folded into the statement in place of the generic identifiers before dispatch.

20 Claims, 5 Drawing Sheets

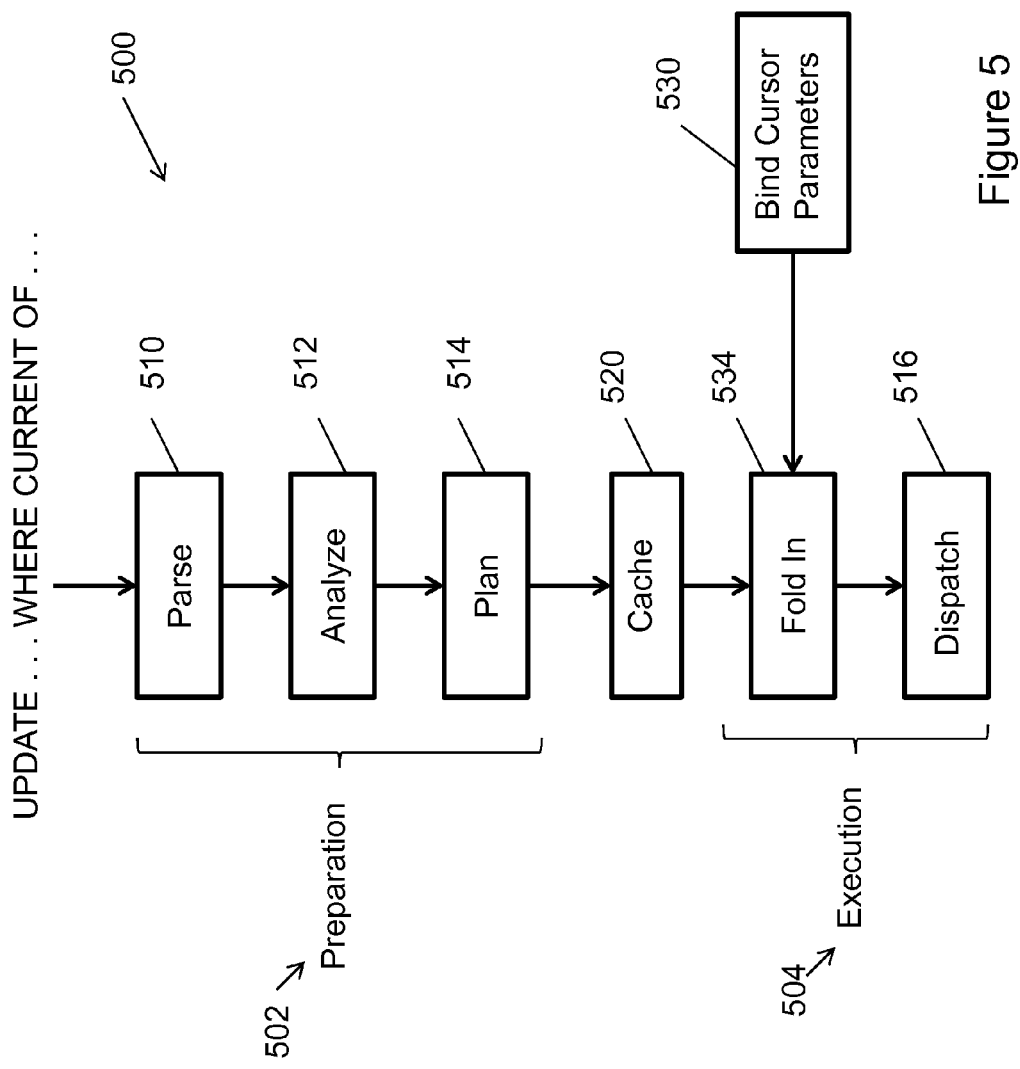

POSITIONED UPDATES IN A DISTRIBUTED SHARED-NOTHING DATA STORE

BACKGROUND

This invention relates generally to updating data in databases, and more particularly to positioned updates in distributed shared-nothing data stores.

A database cursor is a control structure that enables traversal over the records in a database for subsequent processing, such as retrieval, updating or removal, and is analogous to an iterator. Cursors are used to process individual rows returned by database system queries, and enable the rows of a result set to be processed sequentially.

In SQL procedures, an updatable cursor may define a result set, such as a set of data rows. Updatable cursors are a convenient and efficient procedure for performing complex logic on a row-by-row basis or returning the data set directly to a user that called the procedure. A user or client application can declare a SQL updatable cursor using the standard DECLARE CURSOR syntax to scroll the data set, and update a row of data positioned at the current location of the cursor using the WHERE CURRENT OF and UPDATE syntax. In order to support this functionality, the database management system (RDBMS) must be able to determine which row is currently positioned under the cursor. This is usually not a problem when all the data is in a single database that supports updatable cursors and is hosted by a single server. However, in a large distributed shared-nothing data store in which data is distributed across multiple disparate segment nodes, a current row of result data under a cursor may similarly be spread across multiple segment nodes and be stored in different physical locations on the segment nodes. When a user issues a command to update the current row of a result set under a cursor, the drivers on the segment nodes may have no idea on which row the cursor is actually positioned. This is because the WHERE statement of the updatable SQL cursor is imprecise. Thus, data in many different rows on the segments may be undesirably updated. Accordingly, updatable cursors have generally been unavailable for distributed shared-nothing data stores.

It is desirable to provide updatable cursors in a distributed shared-nothing data store and that address the foregoing and other problems of updatable cursors and updating data in distributed data stores, and it is to these ends that the present invention is directed.

BRIEF DESCRIPTION OF THE DRAWINGS

FIG. 5 is a block diagram illustrating a process in accordance with the invention for an updatable cursor with cached execution plans.

DESCRIPTION OF PREFERRED EMBODIMENTS

This invention is particularly well adapted to positioned updates using SQL updatable cursors in distributed shared-nothing data stores, and will be described in that context. It will be appreciated, however, that this is illustrative of only one utility of the invention and that it may be used with other types of databases and for other purposes.

Figure 1:
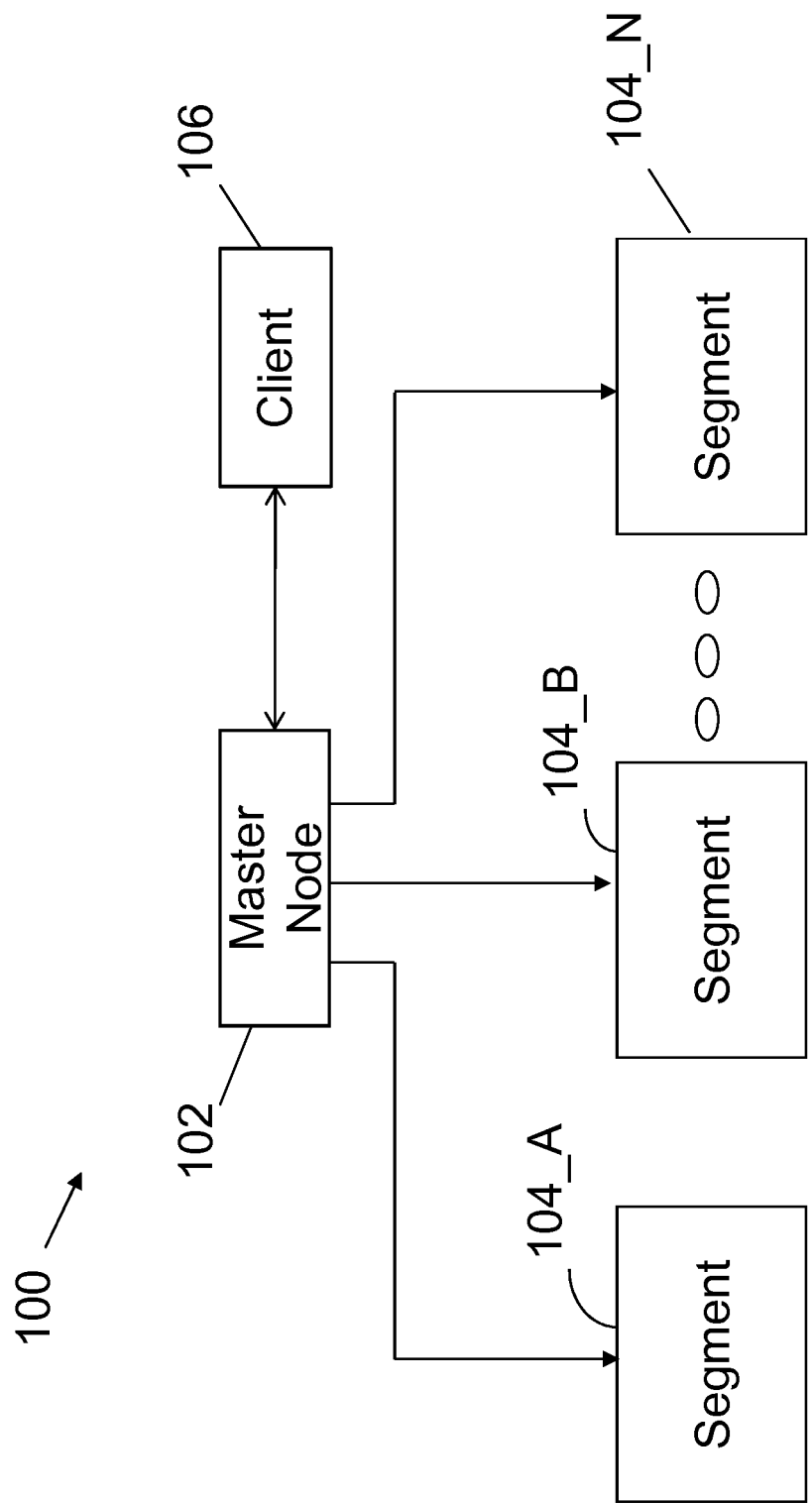
FIG. 1 illustrates the architecture of a shared-nothing data store of the type with which the invention may be employed.

FIG. 1 illustrates the system architecture of a distributed shared-nothing data store 100 of a known type with which the invention may be used. The data store 100 includes a master node 102 and a set of physically distributed shared-nothing nodes or segments 104_A through 104_N connected together by a network. Each shared-nothing segment 104 may have its own memory, storage disks and input/output devices that operate independent of any other node in the architecture 100. Each segment is self-sufficient and shares nothing across the network. Therefore, there are no points of contention across the system and no sharing of system resources. A client 106 (which may be either a user or an application) communicates with the master node 102 to store, retrieve and update data in the data store.

Figure 2:
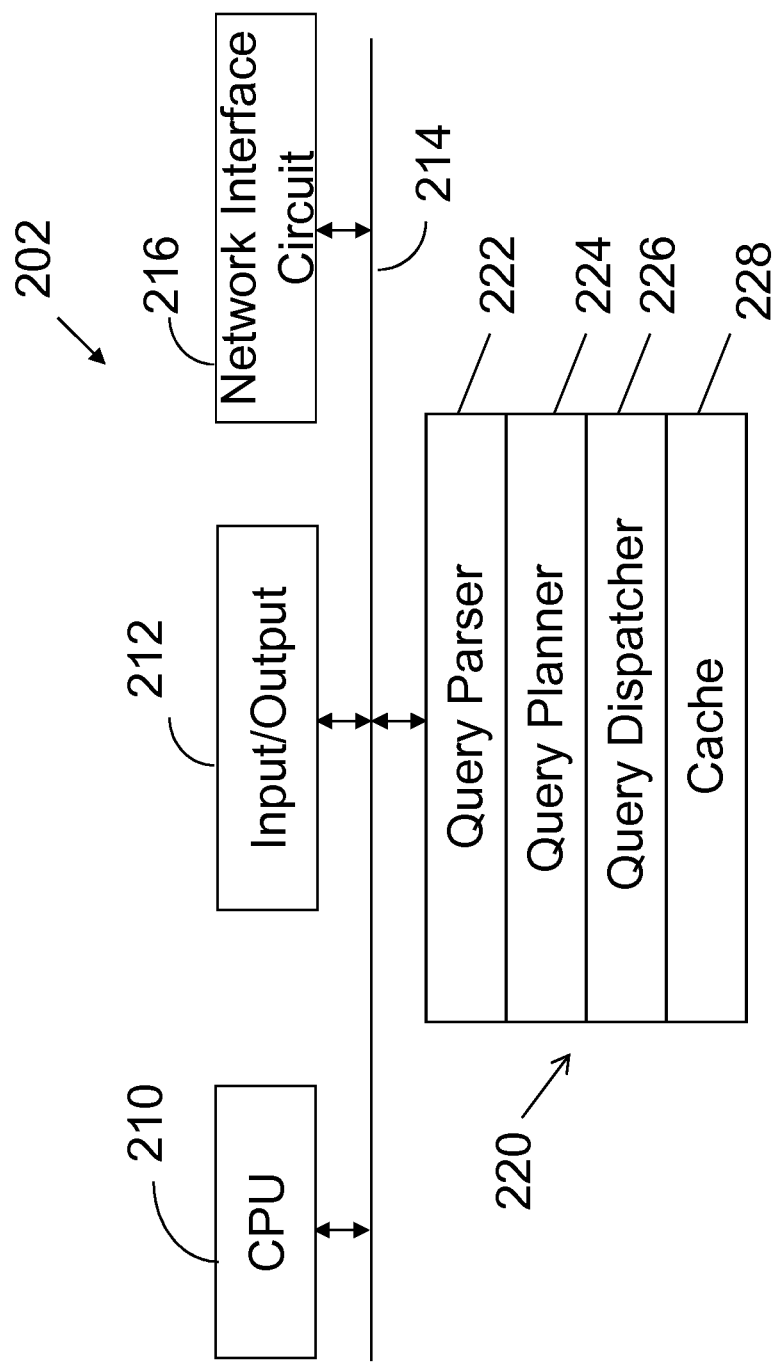
FIG. 2 is a block diagram illustrating an embodiment of a master node of the system of FIG. 1.

FIG. 2 illustrates an embodiment of a master node 202 of the data store 100 that is configured to implement operations in accordance with the invention. The master node 202 may include standard components, including a CPU 210 attached to input/output devices 212 via a bus 214. The input/output devices 212 may include standard components, such as a keyboard, mouse, display, printer and the like. A network interface circuit 216 is also connected to the bus 214, allowing the master node 202 to operate in a networked environment.

A memory 220 may also be connected to the bus 214. The memory 220 stores executable instructions to control the CPU to implement operations in accordance with the invention. The memory stores instructions to implement, among other things, a query parser 222, a query planner or query optimizer 224, and a query dispatcher 226. The memory 220 may also have storage 228, such as a cache, for data and other information.

The query parser 222 comprises executable instructions to interpret a database query from a client. The query parser typically checks for correct syntax and builds a data structure to represent the query. The query planner or query optimizer 224 processes the output from the query parser and develops a query plan to execute the query. A query plan specifies a set of steps that are used to access or modify the data associated with the query. Details, such as how to access a given data relation, in which order to join data relations, sort orders, and so on, may form part of a query plan. For a given query, a large number of query plans may be generated by varying different constituents of the query plan, such as access paths, join methods, join predicates, and sort orders. A typical data store query may produce several hundreds of millions of possible execution plans, from which an optimal plan is selected. The cost of a query plan can be modeled in terms of various parameters, including, for example, the number of disk accesses and the response time required to fetch data. The query optimizer may evaluate the costs of all possible query plans for a given query and determine the optimal, i.e., most efficient plan for executing the query. Optimal queries that are likely to be reused, such as scrolling and updating a data set, may be cached in storage 228 to obviate the costs of repeating the planning/optimization each time the query is reused.

Once an optimal query plan is selected, it is passed to the query dispatcher 226. The query dispatcher 226 dispatches the query plan to the shared-nothing segments for execution. Query results returned from the segments may be stored also be cached in storage 228 and provided to the client.

As will be described below, the invention affords updatable cursors for position updates in a distributed shared-nothing data store by providing a robust process and mechanism for accurately identifying the physical locations of a row on the disks of a distributed data store, by identifying the segments on which the row is located, as well as its physical locations in data files on disks of those segments using hidden metadata. This identifying metadata is attached to each row in a data store, and may be injected transparently into a position update requested by the user/client. The metadata allows a user to declare a cursor to scroll the results of a particular query, and to perform a position update accurately on the data of a particular row under the cursor at the actual physical location of the data on the segments.

As will be described in more detail, the invention recognizes that when the user declares a cursor, the user intends to invoke an updatable cursor. Accordingly, to support this functionality, the invention uniquely identifies each row of data by associating hidden metadata with every row. The metadata includes an identifier ("segment_id") that identifies the segment from which the current row under the cursor originated, and a second tuple identifier ("tuple_id") that identifies the file and row location on a disk of the particular segment from which the current row originated. Then, during the WHERE CURRENT OF "my_cursor" statement, the query is transparently modified to recall and insert the segment_id and the tuple_id implied by my_cursor, which allows the UPDATE statement to isolate and mutate the desired tuple.

Figure 3:
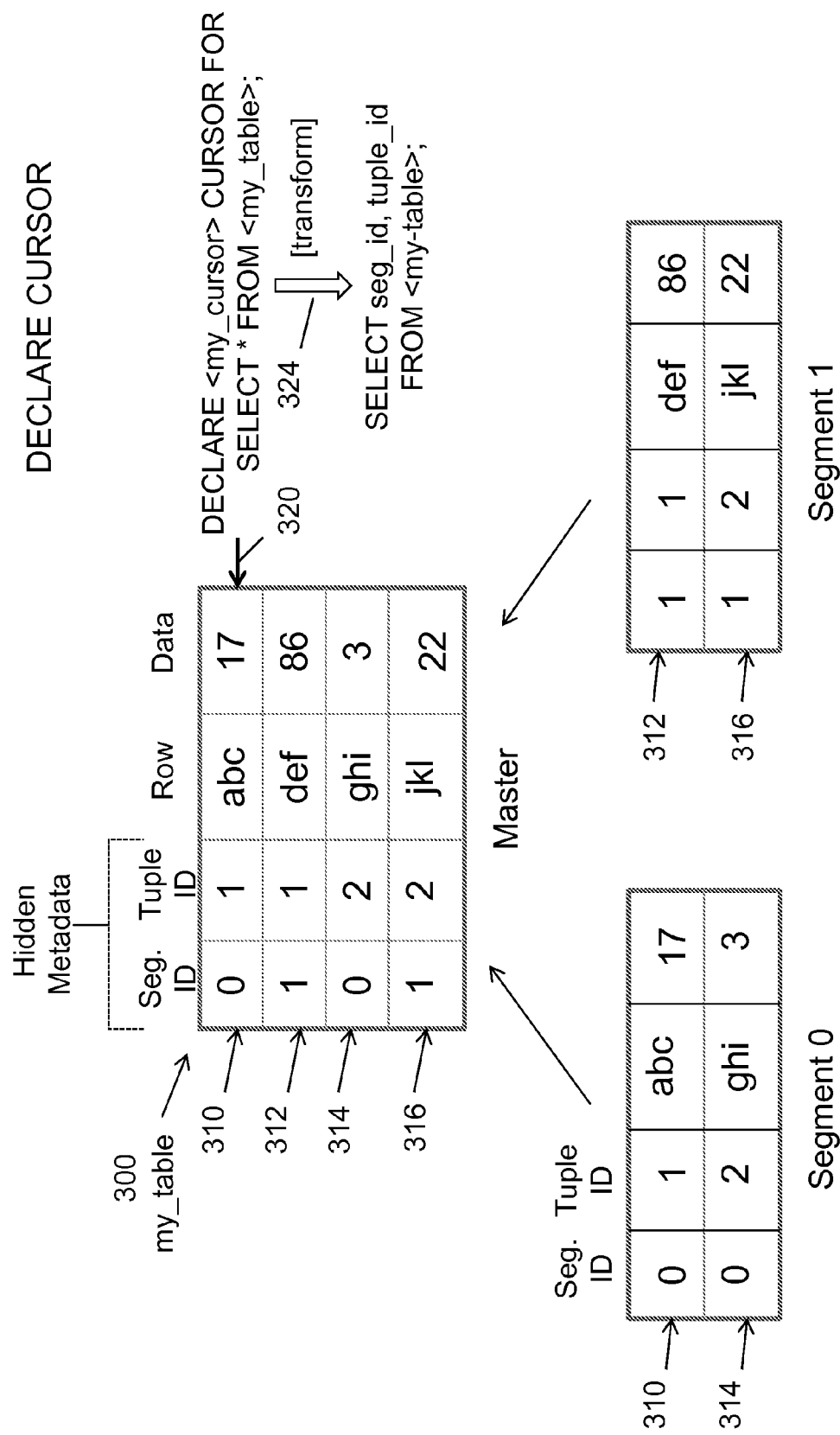
FIG. 3 is a diagrammatic view illustrating an embodiment of a DECLARE CURSOR operation in accordance with the invention in a distributed shared-nothing data store.
Figure 4:
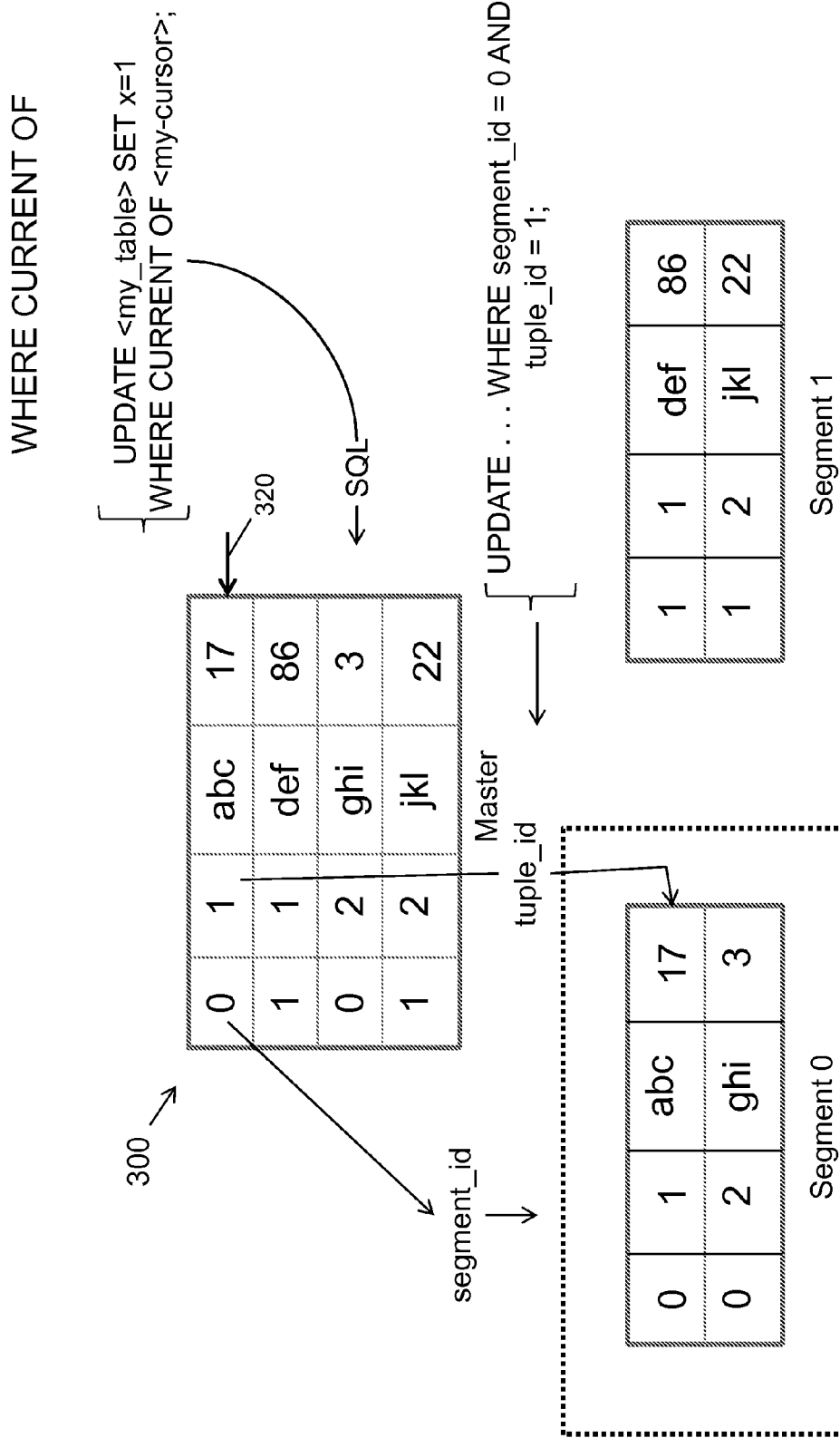
FIG. 4 is a diagrammatic view illustrating an embodiment of UPDATE and WHERE CURRENT OF operations in accordance with the invention in a distributed shared-nothing data store.

FIG. 3 illustrates the DECLARE CURSOR operation of the invention. The SQL syntax for declaring an updatable cursor is generally of the form:

DECLARE my_cursor CURSOR FOR SELECT * FROM my_table;

where "my_cursor" is a name given to the cursor, and "*" is a result in a table named "my_table". FIG. 4 illustrates the UPDATE . . . WHERE CURRENT OF operation of the invention for a positioned update to change the data under the cursor. The syntax for the UPDATE and WHERE CURRENT OF operation is generally of the form:

UPDATE my_table SET x=<value>WHERE CURRENT OF my_cursor; This updates the data "x" in "my_table" in the row under "my_cursor" to "value". However, as previously discussed, in a distributed shared-nothing data store the rows of my_table may be spread across multiple different segments, and several segments may have only a portion of my_table. If a client reviewing a result set of a query opens a cursor and decides to update a row under the cursor and the master simply issued the update statement to all segments, there would be ambiguity on the segments as to what row to update. The invention avoids this problem, as noted above, by precisely identifying each row of a result set and its locations on the different segments with metadata that identifies both the segment from which a row originated and its location on the segment. This is illustrated in FIGS. 3 and 4.

Referring to FIG. 3, the result set 300 of a query dispatched from the master node to the segments is returned to the master node with data from, for instance, Segments 0 and 1, respectively, and the result set of returned data may be presented to a user/client that issued the query in the form of a table having four rows (310, 312, 314 and 316) and four columns of information, for the example shown. The table may be named "my_table". The invention associates each row of data in the table with hidden metadata that includes a segment identifier ("Seg. id") that identifies the segment from which it originated, and a tuple identifier ("Tuple id") that identifies the location on the segment of that row. As shown, table 300 contains two rows of data "abc" (310) and "ghi" (314) from Segment 0 at tuple locations "1" and "2", respectively, and two rows "def" (312) and "jkl" (316) from Segment 1 at tuple locations "1" and "2", respectively.

When a user reviewing the result set declares a cursor by issuing the statement "DECLARE my_cursor CURSOR FOR SELECT * FROM my_table;", the master uses the hidden metadata to transform the SELECT portion of the statement as shown at 324 to "SELECT segment_id=<Seg. ID>, tuple_id=<Tuple ID>FROM my_table;", where <Seg. ID> and <Tuple ID> are the metadata values in the respective columns of the table that unambiguously identify the location of the cursor. If the cursor 320 is located on row 310 of the table as shown in FIG. 3, the row came from Segment 0 at Tuple location 1. Thus, the SELECT portion of the statement is transformed to: "SELECT segment_id=0, tuple_id=1 FROM my_table;".

Next, referring to FIG. 4, with the cursor 320 on row 310 as shown, when the user performs a positioned update to modify the data under the cursor and issues an UPDATE statement such as: "UPDATE my_table SET x=1 WHERE CURRENT OF my_cursor;", the invention uses the hidden metadata to transform transparently (to the user) the statement dispatched to the segments to include the segment and tuple identifiers, i.e.: "UPDATE . . . WHERE segment_id=0 AND tuple_id=1;". Thus, all segments except Segment 0 will ignore the statement, and Segment 0 will modify the data at the identified tuple location 1 to have the set value 1. Accordingly, only the desired data will be actually modified.

Thus, by associating metadata with each row of data on the segments of a distributed shared-nothing data store that unambiguously identifies the physical location of each row, transparently to the user, the invention advantageously enables updatable cursors and positioned updates to be used for efficiently and accurately for modifying distributed data in the data store.

FIG. 5 illustrates a process 500 in accordance with another embodiment of the invention that enables the updatable cursors of the invention to be employed with cached query plans.

As implied above, building a query plan can be a costly and time-consuming process. Referring to FIG. 5, the query process involves two different phases, a preparation phase 502 and an execution phase 504. The preparation phase typically comprises query parsing 510, analyzing 512, and planning or optimization 514. In the execution phase the query plan is dispatched 516 for execution. For many queries, the parsing, analyzing and planning operations are the most costly of the process, and consume a significant portion of the total run time of the query. Caching query plans, as indicated at 520, allows a data store to skip these operations for plans which have already been generated the next time the queries are run, thereby reducing execution times and costs, and improving performance. Caching is particularly effective for queries involving repetitive operations, such as scrolling data.

The problem with cached query plans in a distributed shared-nothing data store is that when the cursor moves to fetch a new row, the metadata for the new row will be different, but the cached query plan will still have the old metadata. Thus, upon dispatch, an update statement "UPDATE . . . WHERE CURRENT OF . . . " will modify the wrong data. The invention solves this problem by building and caching a query plan that uses generic metadata identifier values for segment_id and tuple_id, such as "X" and "Y". Then, prior to dispatch of the update statement of query plan at 516, the cursor parameters (metadata) for the current cursor row location are determined at 530 and folded into the generic query plan from cache 520 at 534 in place of X and Y. Thus, when the update is executed, the metadata correctly identifies the row location of the cursor so that the correct row is updated on the segments.

As may be appreciated from the foregoing, the invention affords a robust and efficient approach to accomplishing positioned updates accurately and transparently in a distributed shared-nothing data store, while advantageously enabling beneficial use of caching of query plans.

An embodiment of the invention affords a computer storage product comprising computer readable physical (non-transitory) storage medium storing the workflow framework as executable instructions for controlling the operations of a computer to perform the processing operations described herein. The computer readable medium may be any standard well known storage media, including, but not limited to magnetic media, optical media, magneto-optical media, and hardware devices configured to store and execute program code, such as application-specific integrated circuits (ASICs), programmable logic devices, and semiconductor memory such as ROM and RAM devices.

While the foregoing has been with reference to preferred embodiments of the invention, it will be appreciated by those skilled in the art that changes to these embodiments may be made without departing from the principles and spirit the invention, the scope of which is defined in the appended claims.

The invention claimed is:

1. A method comprising:
associating each row of a database table distributed among segments of a distributed data store with a respective segment identifier indicating a segment on which the row is stored;
receiving one or more query statements including a declaration of a structured query language cursor and an update statement, the declaration including a select statement for retrieving one or more rows of data from the database table, the select statement including a field name identifying a data field for selection from the one or more rows, the cursor being defined for scrolling the data field of the one or more rows, the update statement including a statement for updating the data field of the one or more rows;
transforming the select statement, including adding a segment identifier data field as a new data field in the select statement;
transforming the update statement, including adding a respective segment identifier to each of the one or more rows of data retrieved by executing the transformed select statement, each segment identifier being retrieved according to the added segment identifier data field; and
dispatching the transformed update statement to the segments.

2. The method of claim 1, wherein the segment identifier is hidden from user-specified query statements, and transforming the select statement and transforming the update statement occur transparently to the user.

3. The method of claim 1, wherein each row is further associated with a respective tuple identifier identifying a file and a disk location where the row is stored on a respective segment.

4. The method of claim 3, wherein transforming the select statement further includes adding a tuple identifier data field as a second new data field in the select statement.

5. The method of claim 4, wherein transforming the update statement further includes adding a respective tuple identifier to each of the one or more rows of data retrieved by executing the transformed select statement, each tuple identifier being retrieved according to the added tuple identifier data field.

6. The method of claim 5, wherein the declaration of the cursor comprises a DECLARE CURSOR statement, and the update statement comprises an UPDATE . . . WHERE CURRENT OF statement to modify data stored in the data field of a current row of the cursor.

7. The method of claim 1, wherein each segment attaches the segment identifier to data in each of the one more rows.

8. The method of claim 1 further comprising building and caching queries for reuse by a master node of the distributed data store, wherein the distributed data store is a distributed shared-nothing data store, and building the queries comprises folding into each query at least one segment identifier.

9. Computer readable non-transitory media for storing executable instructions for controlling the operation of one or more computers to perform operations comprising:
associating each row of a database table distributed among segments of a distributed data store with a respective segment identifier indicating a segment on which the row is stored;
receiving one or more query statements including a declaration of a structured query language cursor and an update statement, the declaration including a select statement for retrieving one or more rows of data from the database table, the select statement including a field name identifying a data field for selection from the one or more rows, the cursor being defined for scrolling the data field of the one or more rows, the update statement including a statement for updating the data field of the one or more rows;
transforming the select statement, including adding a segment identifier data field as a new data field in the select statement;
transforming the update statement, including adding a respective segment identifier to each of the one or more rows of data retrieved by executing the transformed select statement, each segment identifier being retrieved according to the added segment identifier data field; and
dispatching the transformed update statement to the segments.

10. The computer readable media of claim 9, wherein the segment identifier is hidden from user-specified query statements, and transforming the select statement and transforming the update statement occur transparently to the user.

11. The computer readable media of claim 9, wherein each row is further associated with a respective tuple identifier identifying a file and a disk location where the row is stored on a respective segment.

12. The computer readable media of claim 11, wherein transforming the select statement further includes adding a tuple identifier data field as a second new data field in the select statement.

13. The computer readable media of claim 12, wherein transforming the update statement further includes adding a respective tuple identifier to each of the one or more rows of data retrieved by executing the transformed select statement, each tuple identifier being retrieved according to the added tuple identifier data field.

14. The computer readable media of claim 13, wherein the declaration of the cursor comprises a DECLARE CURSOR statement, and the update statement comprises an UPDATE . . . WHERE CURRENT OF statement for modifying data stored in the data field of a current row of the cursor.

15. The computer readable media of claim 9, wherein said instructions cause each segment to attach the segment identifier to data in each of the one or more rows.

16. The computer readable media of claim 9, the operations comprising building and caching queries for reuse by a master node the distributed data store is a distributed shared-nothing data store, and building the queries, wherein building the queries comprises folding into each query at least one segment identifier.

17. A system comprising:
a distributed data store including:
   a master node comprising one or more processors; and
   a plurality of segments; and
computer-readable non-transitory media storing instructions operable to cause the distributed data store to perform operations comprising:
   associating each row of a database table distributed among the segments with a respective segment identifier indicating a segment on which the row is stored;
   receiving one or more query statements including a declaration of a structured query language cursor and an update statement, the declaration including a select statement for retrieving one or more rows of data from the database table, the select statement including a field name identifying a data field for selection from the one or more rows, the cursor being defined for scrolling the data field of the one or more rows, the update statement including a statement for updating the data field of the one or more rows;
   transforming the select statement, including adding a segment identifier data field as a new data field in the select statement;
   transforming the update statement, including adding a respective segment identifier to each of the one or more rows of data retrieved by executing the transformed select statement, each segment identifier being retrieved according to the added segment identifier data field; and
   dispatching the transformed update statement to the segments.

18. The system of claim 17, wherein the segment identifier and tuple identifier are hidden from user-specified query statements, and the transforming the select statement and the transforming the update statement occur transparently to the user.

19. The system of claim 17, wherein each tuple identifier specifies a file and a disk location at which a respective row of data is stored on a segment.

20. The system of claim 17, wherein the declaration of the cursor comprises a DECLARE CURSOR statement, and the update statement comprises an UPDATE . . . WHERE CURRENT OF statement to modify data stored in the data field of a current row of the cursor.

* * * * *